United States Patent [19]

Braunlich

[11] 4,238,661

[45] Dec. 9, 1980

[54] PRESSURE-SENSING CAPACITOR AND METHOD OF TRIMMING SAME

[75] Inventor: Peter F. Braunlich, Pullman, Wash.

[73] Assignee: The Bendix Corporation, Southfield, Mich.

[21] Appl. No.: 947,907

[22] Filed: Oct. 2, 1978

[51] Int. Cl.$^3$ .............................................. B23K 27/00
[52] U.S. Cl. ............................ 219/121 LN; 29/25.41; 29/593; 361/283
[58] Field of Search .... 219/121 L, 121 LM, 121 EM; 361/283; 29/593, 25.41, 25.42

[56] References Cited

U.S. PATENT DOCUMENTS

| | | | |
|---|---|---|---|
| 2,603,737 | 7/1952 | Erdman, Jr. | 29/593 X |
| 3,330,696 | 7/1967 | Ullery, Jr. et al. | 219/121 LM |
| 3,360,398 | 12/1967 | Garibotti | 219/121 LM |
| 3,369,101 | 2/1968 | DiCurcio | 219/121 L |
| 3,597,579 | 8/1971 | Lumley | 219/121 LM |
| 3,634,727 | 1/1972 | Polye | 361/283 X |
| 3,715,638 | 2/1973 | Polye | 338/334 X |
| 3,750,049 | 7/1973 | Dowley et al. | 219/121 LM X |
| 3,750,476 | 8/1973 | Brown | 361/283 X |
| 3,753,373 | 8/1973 | Brown | 73/362 R |
| 3,858,097 | 12/1974 | Polye | 73/398 C |
| 3,895,421 | 7/1975 | Miller | 29/593 X |
| 4,084,438 | 4/1978 | Lee et al. | 361/283 X |
| 4,151,578 | 4/1979 | Bell | 361/283 |
| 4,158,217 | 6/1979 | Bell | 361/283 |

Primary Examiner—C. L. Albritton
Attorney, Agent, or Firm—Markell Seitzman; Russel C. Wells

[57] ABSTRACT

A pressure-sensing capacitor and a method for trimming the capacitor is disclosed. The capacitor includes a pair of spaced flexible quartz plates. A thin circular layer of conductive metal is formed on the opposing inner surfaces of the plates to define the electrodes of the capacitor. A glass frit sealing compound, forming a concentric ring about the conductive layers, is disposed between the plates to seal the evacuated space between the plates. The thickness of the ring is small enough so that the capacitance between the electrodes is higher by an unknown amount than the desired value of capacitance at every point in the range of variation of the value of pressure. The capacitor is trimmed by first measuring the capacitance value at zero pressure. In two of the embodiments disclosed the capacitance value at a maximum pressure is also measured. The dimensions and location of a path on one of the electrodes is computed from a measured capacitance value(s) and the deflection characteristics of the plates. Radiant energy in the form of a laser beam is applied to the electrode to cut through the electrode along the computed path to electrically insulate a first part of the layer from a second part of the layer so that the value of capacitance at zero pressure is substantially equal to the desired value.

11 Claims, 9 Drawing Figures

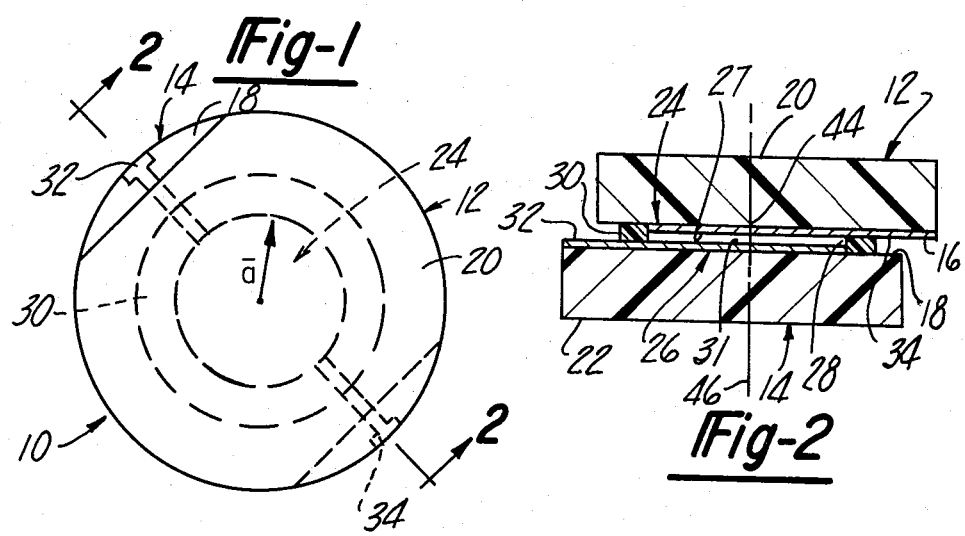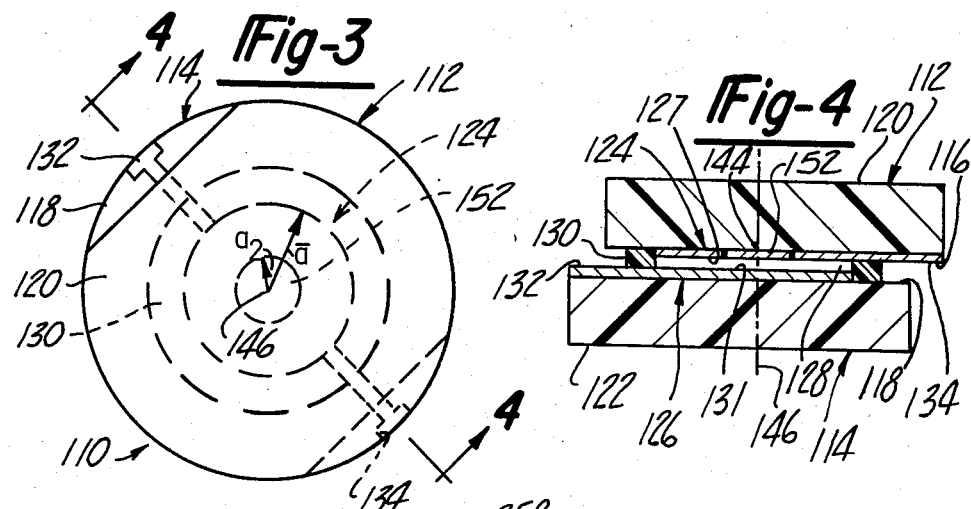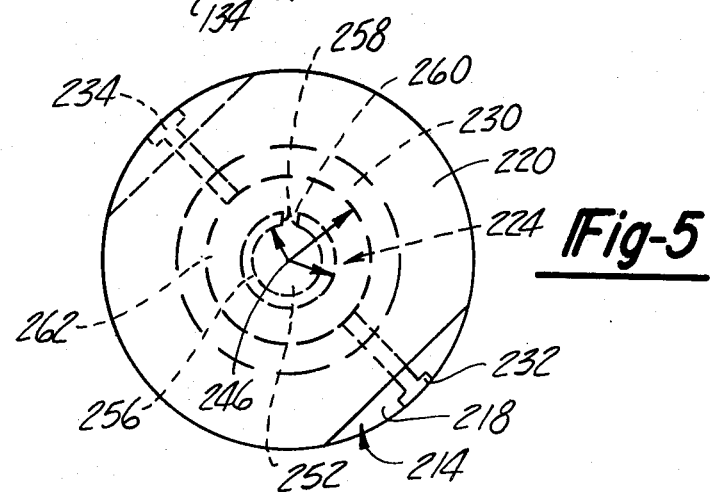

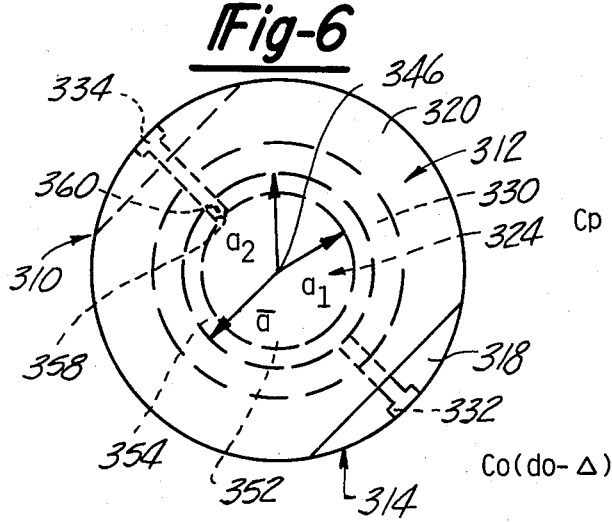
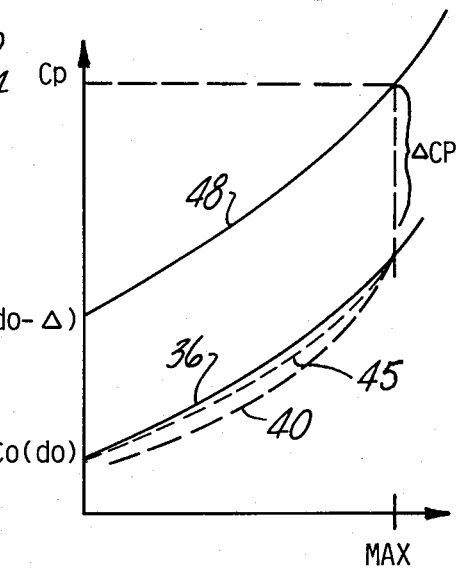
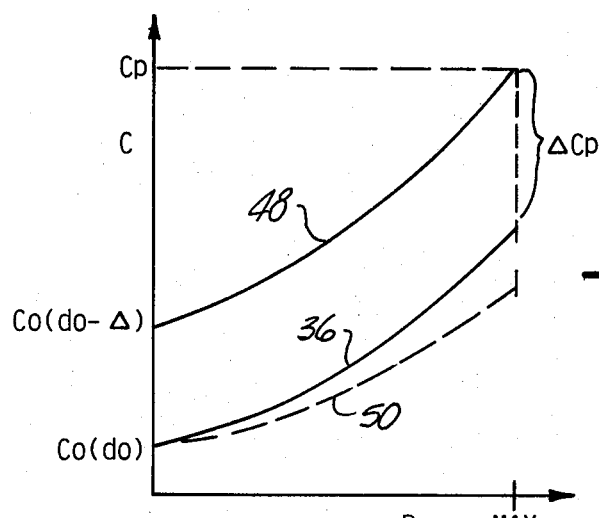
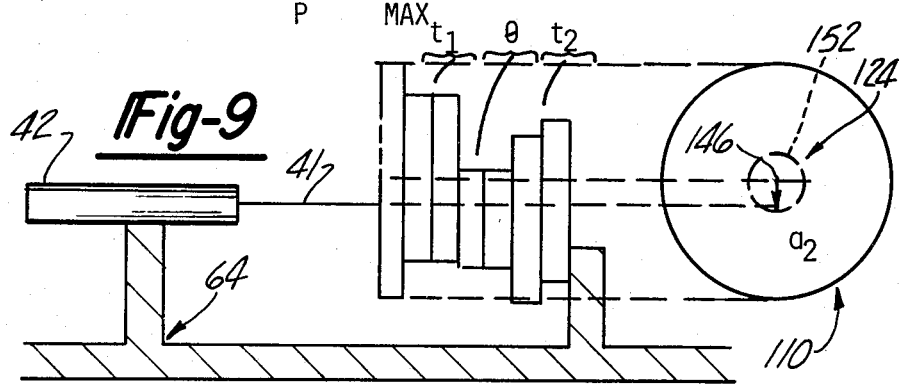

PRESSURE-SENSING CAPACITOR AND METHOD OF TRIMMING SAME

TECHNICAL FIELD

This invention relates to a method of trimming pressure sensing capacitors using radiant energy.

BACKGROUND ART

It has become increasingly important to provide accurate measurements of various parameters such as pressure. One area in which such measurement of pressure is important is the intake manifold pressure which represents an engine fuel demand parameter as shown in the U.S. patent application Ser. No. 881,321 entitled Microprocessor Based Electronic Engine Control System, filed Sept. 27, 1977 and having the same assignee as the subject application.

In the manufacture of a large number of capacitors, it is extremely difficult to control all of the parameters with sufficient accuracy to obtain the required capacitance value for each capacitor manufactured. This is particularly true when high precision capacitors are required. As a result, it is either necessary to discard large numbers of capacitors because they do not meet the specified tolerances or to trim the capacitors to value.

The U.S. Patent to Lumley No. 3,597,579 shows a laser trimming technique for capacitors involving adjusting the effective area of an electrode by applying radiant energy to the electrode. An electrical potential is applied across the electrodes of the capacitor while the radiant energy is applied thereto to inhibit the formation of electrical shorts.

The trimming of a pressure-sensing capacitor is complicated by the fact that the capacitance value of the capacitor varies with pressure. Therefore, any trimming of pressure-sensing capacitors must allow for reproducible sensor performance through a range of pressures to eliminate or substantially reduce the need for complete calibration of individual sensors.

The U.S. Patent to Brown, No. 3,750,476, issued Aug. 7, 1974, discloses a pressure transducer comprising a pair of sealed members uniformly spaced and coated with an electrically conductive material to define a pair of plates in a capacitor. The U.S. Patent to Polye, No. 3,858,097, issued Dec. 13, 1974, discloses a pressure sensing capacitor comprising a hollow body having spaced opposite walls supported at their edges with electrical conducting means formed on deflecting portions of the wall. Other capacitor pressure transducers are shown in U.S. Pat. Nos. 3,634,727, 3,715,638 and 3,753,373.

Filed concurrently herewith is a patent application identified as P-314 by Binneg Yanbing Lao entitled "Improved Pressure Sensing Capacitor and Method of Trimming Same" and having a common assignee as the subject application. The Lao application discloses a pressure-sensing capacitor and method wherein an eccentric disc portion is trimmed from the capacitor's electrode.

DISCLOSURE OF THE INVENTION

An object of the invention is to provide a method of making a variable capacitor having first and second conductive plates being movable relative to each other, the first conductive plate being formed of a conductive sheet supported on a non-conductive substrate, the method including the step of cutting through the conductive sheet along a path computed from the displacement characteristics between the first and second conductive plates.

Yet another object of the present invention is to provide a method of trimming a pressure-sensing capacitor having a pair of thin electrodes formed on the opposing inner surfaces of a pair of spaced plates wherein the method includes the steps of focusing a laser beam at a spot a predetermined distance from a deflection axis and displacing the electrode relative to the focused laser beam.

In carrying out the above objects and other objects of the invention a preferred embodiment of the invention includes a variable capacitor of the type having a first conductive plate which is movable relative to the second conductive plate in accordance with known displacement characteristics in response to changes in the value of a variable physical quantity wherein the capacitor has a value of capacitance at every point in the range of variation of the value of the physical quantity whereby the capacitance value is a function of the physical quantity. The capacitor comprises first and second conductive plates disposed opposite each other and being spaced apart, the first conductive plate comprising a conductive sheet supported on a nonconductive substrate, the conductive sheet including first and second parts which are insulated from each other. The first part of the conductive sheet is of such dimensions and location that the second conductive plate and the second part of the first conductive plate have a predetermined value of capacitance therebetween when the capacitor is subjected to a first value of the physical quantity within said range of values. The second conductive plate and the second part of the first conductive plate have a value of capacitance at every other point in the range of variation of the value of the physical quantity substantially equal to corresponding predetermined values of capacitance when the capacitor is subjected to the remaining values of the physical quantity within said range of values.

In further carrying out the above objects and other objects of this invention of making a variable capacitor of the type having a first conductive plate being formed of a conductive sheet supported on a nonconductive substrate and which is spaced from and disposed opposite a second conductive plate, the first conductive plate being movable relative to the second conductive plate in accordance with known displacement characteristics in response to changes in the value of a variable physical quantity such that the capacitance therebetween is higher by an unknown amount than the desired value of capacitance at every point in the range of variation of the value of the physical quantity whereby the capacitance value is a function of the physical quantity. A preferred method includes the steps of measuring the capacitance value while subjecting the capacitor to a predetermined value of the physical quantity and computing the location and dimensions of a first part of said conductive sheet according to a predetermined function of the measured capacitance value and said known displacement characteristics between the first and second conductive plates, the first part contributing an increment of capacitance between the plates having a value equal to the amount by which the measured capacitance exceeds the desired capacitance. The method further includes the step of cutting through the conductive sheet along a path defined by the location and dimensions of the first part of the conductive sheet to sever the first part from a second part of the sheet so that the value of capacitance between the second conductive sheet and the second part of the conductive sheet is substantially equal to the desired value of capacitance when the capacitor is subjected to said predetermined value of the physical quantity.

The objects, features and advantages of the present invention are readily apparent from the following detailed description of the best mode taken in connection with the accompanying drawings.

BRIEF DESCRIPTION OF THE DRAWINGS

FIG. 1 is a top plan view of a pressure-sensing capacitor that need not be trimmed;

FIG. 2 is a sectional view of the capacitor taken along the line 1—1 of FIG. 1 with the thickness of the sealing compound and the conductive layers exaggerated for illustrative purposes;

FIG. 3 is a top plan view of a pressure-sensing capacitor constructed according to the invention;

FIG. 4 is a sectional view of the second pressure-sensing capacitor taken along the line 4—4 of FIG. 3 with the thickness of the sealing compound and the conductive layers exaggerated for illustrative purposes;

FIG. 5 is a top plan view of a pressure-sensing capacitor constructed according to the invention;

FIG. 6 is a top plan view of another pressure-sensing capacitor constructed according to this invention;

FIG. 7 is a capacitance-pressure graph illustrating how the capacitance of the trimmed capacitors of FIGS. 5 and 6 vary with externally applied pressure as indicated by the broken lines;

FIG. 8 is a capacitance-pressure graph illustrating how the capacitance of the trimmed capacitor of FIG. 3 varies with externally applied pressure as indicated by the dotted line; and FIG. 9 shows in schematic form an apparatus for providing the mechanical motions necessary for trimming the capacitors.

BEST MODE FOR CARRYING OUT THE INVENTION

A pressure-sensing capacitor which has a capacitance substantially equal to a desired value of capacitance at every point in the range of variations of the value of pressure is generally indicated at 10 in FIGS. 1 and 2. The capacitor 10 includes a pair of spaced parallel plates 12 and 14. Each plate 12 and 14 is circular except for a small peripheral portion which has been removed from each plate 12 and 14, the purpose of which will become more apparent hereinafter. The plates 12 and 14 comprise polished fused transparent quartz or glass of substantially uniform thickness. The use of quartz is advantageous in that quartz is chemically inert so it will not corrode in adverse environments and, furthermore, quartz withstands considerable forces and compressions to measure high pressures and at the same time exhibit substantially no hysteresis characteristics when subjected to stresses or strains. Also, quartz has a very low temperature coefficient of expansion so that its response to pressures is substantially uneffected by changes in temperature.

Thin layers or sheets 24 and 26 of conductive material such as chromium metal, several thousand angstroms thick, are formed on the inner surfaces 16 and 18 of the plates 12 and 14, respectively. These metal electrodes or layers 24 and 26 may be formed on the inner surfaces 16 and 18, respectively, by vacuum evaporation or sputtering such that the layers 24 and 26 are substantially uniform in thickness and are substantially identical. The electrodes 24 and 26 are circular and are electrically insulated from each other by a space 28 which is evacuated in any well-known manner to form a vacuum.

When the capacitor 10 is placed in a vacuum the circular electrodes 24 and 26 have a capacitance given by $C_0 = (\bar{a}^2/4d_0)$ [in egs. units, 1 cm = 1/0.9 pF] wherein $\bar{a}$ is the radius of the circular electrodes 24 and 26 and $d_0$ is a perpendicular distance or separation between the two electrodes 24 and 26, and, due to the relative thinness of the metal electrodes 24 and 26, is also substantially the distance between the two plates 12 and 14.

In the preferred embodiment of this invention an electric insulator comprising a thin layer of $SiO_2$ (not shown) is formed at the opposing surfaces 27 and 31 of the electrodes 24 and 26, respectively, and substantially covers the surfaces 27 and 31. Preferably this layer is several thousand angstroms thick and can be formed by using the same mask and vacuum evaporation technique as was used in depositing the chromium metal electrodes 24 and 26 on the inner surfaces 16 and 18.

The plates 12 and 14 are spaced apart a predetermined distance generally in the range of 0.1 to one (1) millimeter by spacer means or a sealing member or ring 30 which maintains the separation $d_0$ in the area of the electrodes 24 and 26 immediately adjacent the sealing ring 30. Preferably, the sealing ring 30 comprises a ring of glass frit disposed concentrically about the electrodes 24 and 26. The glass frit preferably comprises a borosilicate compound.

A conductor means or electrical leads 32 and 34 are integrally formed with the electrodes 26 and 24, respectively, on the inner surfaces 18 and 16 of the plates 14 and 12, respectively. The leads 32 and 34 are formed on non-overlapping portions of the plates 12 and 14 respectively, to allow for easy electrical connection thereto. The leads 32 and 34 are integrally formed with the electrodes 24 and 26, respectively, at the same time the electrodes 24 and 26 are formed on the inner surfaces 16 and 18. That is, the leads 32 and 34 and their respective electrodes 26 and 24 comprise two chromium metal layers several thousand angstroms thick formed by vacuum evaporation or sputtering on the inner surfaces 18 and 16 of the plates 14 and 12, respectively.

During production of the pressure-sensing capacitor 10, the dimensions of the plates 12 and 14 can be kept relatively constant. However, the separation between the electrodes 24 and 26 differs from capacitor to capacitor due to variations in processing the sealing ring 30. It is desirable to produce pressure-sensing capacitors which have a substantially identical capacitance value when placed in a vacuum, $C_0$, as well as at a pressure which is the expected maximum operating pressure, $C(P_{max})$. In order to insure that $C_0$ is a constant value for an entire production run, pressure-sensing capacitors 110, 210 and 310 as shown in FIGS. 3 through 6 are intentionally produced with a somewhat smaller than expected or calculated initial plate separation which can be represented by $d_0 - \Delta$, wherein $d_0$ is the calculated plate separation of the capacitor 10 and wherein $\Delta$ varies because of variations in processing the sealing material 30. The capacitors 110, 210 and 310 are structurally the same as the capacitor 10 before they are trimmed except they have a plate separation of $d_0 - \Delta$ and not $d_0$. In order to achieve a close match in capacitance of the capacitors 110, 210 and 310 at the maximum pressure, $P_{max}$, as well as in a vacuum, the trimming must be done keeping in mind not only the amount of electrode area to be trimmed away but also the location of the trimmed-away electrode area must be carefully chosen, as will be described in greater detail hereinafter with reference to FIGS. 7 and 8.

In the preferred embodiment of the present invention the electrodes 124 and 126 of the capacitor 110 as well as the electrodes 224 and 226 of the capacitor 210 and electrodes 324 and 326 of the capacitor 310 are trimmed or cut by applying radiant energy in the form of a focused laser beam 41 emitted by a laser 42 as shown in FIG. 9 to the electrode 124 through the quartz plate 112 of the capacitor 110. The trimming apparatus as shown in FIG. 9 will be described in greater detail hereinafter.

Although the discussion hereinafter describes the laser cutting of only the top electrode 124, it is to be understood that due to the closeness of the electrodes 124 and 126, the bottom electrode 126 may also be cut by the same focused beam 41 at the same time. For purposes of the following discussion it is unimportant whether the bottom electrode 126 is also cut, since the resulting change in capacitance by also cutting the bottom electrode 126 is insignificant here.

The laser 42 may comprise an Nd:Yag laser, argon-ion laser or one similar which utilizes a sharply focused CW (continuous wave) or pulsed laser beam at any wavelength between 3,000 angstroms and 15,000 angstroms. As a result, the width of the laser cuts in the electrode 124 can be smaller than 50 micrometers.

As in the case of the capacitor 10, the sealing rings 130, 230 and 330 are concentrically formed about their circular electrodes 124, 224 and 324 and 126, 226 and 326, respectively. The sealing rings 130, 230 and 330 disposed between the plates 112, 212 and 312 and 114, 214 and 314, maintain the distance $d_0 - \Delta$ between their respective plates immediately adjacent their respective sealing rings 130, 230 and 330. All of the capacitors 10, 110, 210 and 310 have a corresponding maximum deflection point (only points 44 and 144 are shown) on the inner surfaces on the flexible plates 12, 112, 212 and 312, each of which moves a maximum perpendicular distance towards the other plates 14, 114, 214 and 314, respectively, when the plates 12, 112, 212 and 312 are subjected to pressure at their outer surfaces 20, 120, 220 and 320. Each of the maximum deflection points lie along a corresponding deflection axis 46, 146, 246 and 346 which is perpendicular to the inner surfaces of the corresponding upper plates 12, 121, 212 and 312. The corresponding centers of the metal electrodes 24, 124, 224 and 324 are coincident with the centers of the sealing rings 30, 130, 230 and 330 and also lie along their corresponding deflection axes. The centers of the metal electrodes 24, 124, 224 and 324 deflect more than any other point on the electrodes 24, 124, 224 and 324 towards their corresponding plates 14, 114, 214 and 314 when pressure is applied at the outer surfaces 20, 120, 220 and 320 of the plates 12, 112, 212 and 312.

Referring now to FIGS. 7 and 8, curve 48 represents the pressure-capacitance characteristics of the capacitors 110, 210 and 310 before trimming. The curve 36 represents the pressure-capacitance characteristics of the ideally constructed capacitor 10. The curve 50 represents the pressure-capacitance characteristics of the capacitor 110 after trimming. Curve 40 represents the pressure-capacitance characteristics of the capacitor 210 after trimming. Curve 45 represents the pressure-capacitance characteristics of the capacitor 310 after trimming.

As a general rule, the closer a trimmed portion or part of an electrode is to the perimeter of the circular electrode, the less the characteristic curve of that trimmed capacitor varies from the curve 36, especially near $P_{max}$, as particularly shown in FIG. 7 by the curve 45. Conversely, trimming a portion of an electrode closer to the center of the electrode will cause the characteristic curve of that trimmed capacitor to vary to a greater extent from the curve 36 as shown by the curve 40. Furthermore, if the trimmed portion of the electrode has the center of the electrode as its center, as particularly shown in FIG. 8, the characteristic curve 50 fails to include the desired value of capacitance at $P_{max}$.

MATHEMATICAL BASIS FOR THE TRIMMING TECHNIQUE

The deflection under pressure of a part of clamped plates, such as sealed plates 12 and 14, as previously described is represented by the following equation:

$$y = 3WS(m^2-1)/16\pi Em^2 t^3 [1(a^2-r^2)^2/a^2]$$

where
W = pressure
m = reciprocal of Poisson's ratio
a = glass frit inner radius (wherein $a = \bar{a}$ when the radius of the electrode equals the inner radius of the glass frit as here.)
r = radial distance from the center of the electrode having the deflection y
t = top and bottom plate thickness (assuming equal thickness)
E = Young's modulus
S = an empirically derived correction factor between 1 and 5.14 (the upper limit is that of a simply supported plate; the correction factor compensates for the fact that the clamped plate model (i.e. the above equation without the correcting factor) only approximates the capacitor and will underestimate y. The correction factor is proportional to t if the frit width is greater than t; if less than t, it is inversely proportional to the frit width.

Maximum deflection of the plates 12, 112, 212 and 312 and 14, 114, 214 and 314 is at the common center of their respective electrodes along their deflection axes, wherein r=0. The deflection ratio, of any point $r \sim 0$ to the deflection of the center, (r=0) is $y/y_{max} = 1(a^2-r^2)$-$2/a^4$. For example, given that the fused quartz plates 12 and 14 are two inches in diamter and are clamped over an inflexible sealing ring of 1.5 inch inner diameter, the center of the plate 12 deflects at full load as follows, y(0)=0.15334 millimeters; for t=1/16"; y(0)=0.0417 millimeters, for t=1/18"; and y(0)=0.0052 millimeters, for t=1/4".

In order to determine the capacitance of a trimmed ring 354 as shown in FIG. 6, the value of capacitance of a disc concentric with the electrode 324 and having a radius $a_1$ is subtracted from the value of capacitance of the disc concentric with the electrode 324 and having a radius of $a_2$. In the same way the approximate capacitance of a trimmed portion 256 as shown in FIG. 5 is determined. In mathematical terms this is given by the equation:

$$C_{(ring)} = \frac{1}{4\pi} \left\{ \int_0^{a_2} \frac{2\pi r\, dr}{d_0 - y_1 - y_2} - \int_0^{a_1} \frac{2\pi r\, dr}{d_0 - y_1 - y_2} \right\}$$

wherein $y_1$ and $y_2$ are the upper and lower plate deflections as given by the above-noted deflection equation and r is a polar coordinate.

Referring now to FIGS. 7 and 8, $C_0(d_0-\Delta)$ is a readily measured quantity, and $C_0(d_0)$ is the desired value of capacitance. The quantity $d_0$ at zero pressure is a known desired value and $\Delta$ is determined from the following equation:

$$C_0(d_0 - \Delta) = \frac{(a_2^2 - a_1^2)}{4(d_0 - \Delta)}.$$

When the pressure is at its maximum value (i.e. $P = P_{max}$) the following equation holds true:

$$C(P, d_0-\Delta) - C(P, d_0) = C(P, d_0-\Delta, (a_2/a)) - C(P, d_0-\Delta, (a_1/a)) = \Delta C_p$$

The quantity $C(P,d_0-\Delta)$, can be measured and the quantity $C(P,d_0)$ is the desired value of the capacitance at the maximum pressure. The quantity $C(P, d_0-\Delta, a_2/a)$ represents the capacitance of a concentric disc of radius $a_2$ at $P_{max}$ and is given by the following equation:

$$C(P, d_0 - \Delta, \frac{a_2}{a}) =$$

$$\frac{(a^2)}{(8(kd_0)^{\frac{1}{2}})} \ln \frac{\left\{(1 - \frac{a_2^2}{a}) - \frac{(d_0)^{-\frac{1}{2}}}{k}\right\}}{\left\{(1 - \frac{a_2^2}{a}) + \frac{(d_0)^{\frac{1}{2}}}{k}\right\}} \cdot \frac{(1 + \frac{d_0^{\frac{1}{2}}}{(k)})}{(1 - \frac{(d_0)^{\frac{1}{2}}}{k})}$$

where the constant k is given by the equation: $k = (DSPa^4/2t^3)$ and where $W = \pi a^2 P$ and $$D = \frac{3(1 - .14^2)}{16E}.$$

The value of the expression $C(P, d_0-\Delta, a_1/a)$ is exactly the same as the expression for $C(P, d_0-\Delta, a_2/a)$ except the quantity $a_1$ is substituted for the quantity $a_2$. The expressions containing $a_1$ and $a_2$ are solved for the two unknowns $a_1$ and $a_2$.

In the special case where $a_1 = 0$ or, in other words, a disc 152 of radius $a_2$ is trimmed from the electrode 124 as shown in FIG. 3, the pressure-capacitance characteristics are reduced as shown in FIG. 8 by the line 50. By a proper selection of a and t so that at $P = P_{max}$, $k = \frac{1}{2}d_0$ (which means that the maximum total deflection of both plates 112 and 114 is half the desired plate separation) and assuming that $\Delta = 0.1\, d_0$, removal of the center section 152 of radius $a_2$ reduces the capacitance at $P = P_{max}$ to a value that is only 4.4% below the desired value at $P = P_{max}$. In general, the closer the constant k is to $d_0$, the more pressure sensitive the capacitor sensor 10 is.

In the previous example where $k = \frac{1}{2}d_0$, the total changes in capacitance for an increase of pressure from $P_0$ to $P_{max}$ is only 24.6% of $C_0$. Where $k = 0.75 d_0$ there is an increase of 52% over $C_0$. However, the closer k comes to $d_0$, at $P = P_{max}$, the error between the trimmed characteristic curve 50 and the desired or ideal capacitance pressure curve 36 becomes greater. For example, at $k = 0.75\, d_0$ removing a center section of radius $a_2$ reduces the capacitance at $P_{max}$ to a value that is 16.2% below the desired value again assuming $\Delta = 0.1\, d_0$.

In the case where $a_1 \sim 0$ as shown in FIGS. 5 and 6, a perfect match at $C(P=0)$ and $C(P=P_{max})$ is possible. Where $a_1 \sim 0$ as shown in FIG. 3, a perfect match at the two pressures is possible by changing the integration formula wherein the other polar coordinate ($\theta$) is considered and the integration is from $\theta = 0°$ to $\theta = 360° - \Delta°$ wherein $\Delta°$ is the angle between radial cuts 358 to allow the disc 352 to be electrically connected to a lead 334 by a connector portion 360 defined by the radial cuts 358. In the same fashion, a perfect match can be obtained at the two pressures for the capacitor 210 by permitting the disc 252 to be electrically connected to its lead 234 by a connector portion 260 defined by the radial cuts 258.

TRIMMING TECHNIQUE

The method and apparatus for trimming the capacitors 110, 210 and 310 as shown in FIGS. 3, 4, 5 and 6 will now be described with reference to FIG. 9. The assembly as shown in FIG. 9 includes an argon ion laser 42 which is preferably a Spectra Physics Model 164 argon ion laser mounted on a base 64. The radiant energy emitted by the laser 42 is focused by a lens (not shown). The assembly includes two translational stages $t_1$ and $t_2$, and a rotational stage $\theta$. The laser 42 operates in a continuous or fast pulse mode while delivering sufficient energy to a focal spot of minimal size as previously described.

A capacitor such as the capacitor 110 is centered on $t_1$, shown in its upright position. The setting of $t_1$ is kept constant throughout the trimming process. The setting of stage $t_2$ corresponds to a first predetermined distance from the deflection axis 146 or one of the disc radii, for example $a_1$, while that of stage $t_1$ corresponds to the center of the electrode 124. $\theta$ is turned a full revolution and $t_1$ is kept constant when a circular disc 152 is to be trimmed from the center of the electrode 124 as shown in FIG. 3, as the laser beam 41 cuts completely through the electrode 124.

$\theta$ is turned in a first direction a value less than 360° (i.e. $360° - \Delta°$ with $t_2$ a constant) to make the cuts shown in FIG. 5. Thereafter, stage $t_2$ is moved to effect a radial cut 258 through the electrode 224 to a second predetermined distance $a_2$ with $\theta$ kept constant. Then $\theta$ is turned $360° - \Delta°$ in the opposite direction while $t_2$ is maintained at $a_2$. To obtain the capacitor of FIG. 5, the laser 42 is operated during this counter revolution. Finally, the stage $t_2$ is moved to effect a second radial cut 258 back to the first predetermined distance $a_1$ with $\theta$ held a constant to complete the trimming operation. The laser 42 is not operated during the counter revolution since the distance $a_2$ is the same as $\overline{a}$ or the radius of the electrode 324. The exact same steps are carried out in trimming the electrode 324 of the capacitor 310 except that the radial cuts 358 are made such that the connector portion 360 appears to be part of the lead 334.

As shown in FIG. 5 the electrically insulated portion of the electrode 224 comprises the portion 256 having inner radius $a_1$ and outer radius $a_2$ as determined previously. The radial cuts 258 define the connector portion 260 which forms part of the electrode 224 and electrically connects the disc portion 252 with an exterior ring portion 262 to which the electrical lead 234 is electrically connected. The area of the connector portion 260 is typically a small percentage of the area of the portion 256.

As a result of the described laser trimming process large volume production of these capacitors 110, 210 and 310 is possible without the need for complete calibration of the capacitors which have different initial plate separations (i.e. $d_0 - \Delta$ where $\Delta$ is an unknown value and is allowed to vary) but are otherwise identical in their physical dimensions. The determination of the radii $a_1$ and $a_2$, for example, by means of computer calculations are sufficient to permit laser trimming so that the capacitor's characteristic curve closely follows the desired characteristic curve. In fact, the trimming process described above lends itself readily to computer control. The expressions for $a_1$ and $a_2$ could be incorporated into a computer trimming program. The computer would then control measurement of untrimmed capacitance, compare it with the desired response or target curve, evaluate $a_1$ and $a_2$, and activate the trimming hardware.

While the three embodiments of the capacitors 110, 210 and 310 and the method for trimming the capacitors 110, 210 and 310 have been shown and described herein in detail those skilled in this art will recognize various alternative designs and embodiments for practicing the present invention as defined by the following claims.

What is claimed is:

1. The method of making a variable capacitor of the type having a first conductive plate being formed of a conductive sheet supported on a non-conductive substrate and which is spaced from and disposed opposite a second conductive plate, the first conductive plate being movable relative to the second conductive plate in accordance with known displacement characteristics in response to changes in the value of a variable physical quantity such that the capacitance therebetween is higher by an unknown amount than the desired value of capacitance at every point in the range of variation of the value of the physical quantity whereby the capacitance value is a function of the physical quantity, the method comprising the steps of:

measuring the capacitance value while subjecting the capacitor to a predetermined value of the physical quantity;

computing the location and dimensions of a first part of said conductive sheet according to a predetermined function of the measured capacitance value, as determined in response to said step of measuring, and said known displacement characteristics between the first and second conductive plates, said first part contributing an increment of capacitance between the plates having a value equal to the amount by which the measured capacitance exceeds the desired capacitance; and cutting through the conductive sheet along a path defined by said location and dimensions, determined in said step of computing, of the first part of the conductive sheet to sever the first part from a second part of the sheet so that the value of capacitance between the second conductive plate and the second part of the conductive sheet is substantially equal to the desired value of capacitance when the capacitor is subjected to said predetermined value of the physical quantity.

2. The method as claimed in claim 1 including the step of measuring the capacitance value of the capacitor while subjecting the capacitor to a second predetermined value of the physical quantity and wherein the second measured capacitance value is also used to compute the location and dimensions of the first part of the conductive sheet so that the value of the capacitance between the second conductive plate and the second part of the conductive sheet is substantially equal to the respective desired values of the capacitance when the capacitor is subjected to said first and second predetermined value of the physical quantity, said first part contributing an increment of capacitance between the plates, having a value equal to the amount by which the measured capacitance exceeds the desired capacitance at each of the two predetermined values of the physical quantity.

3. The method as claimed in claim 1 or claim 2 wherein at least one portion of the conductive sheet moves to a greater relative extent than a second portion of the conductive sheet along a deflection axis in response to changes in the value of the physical quantity and wherein said computing step includes the step of computing the location of the first part relative to said deflection axis.

4. The method as claimed in claim 3 wherein the displacement characteristics of the second portion are symmetric about the deflection axis and wherein said cutting step includes the step of cutting a curved path through the conductive sheet, every point along the path being a particular precalculated distance from the deflection axis.

5. The method as claimed in claim 3 wherein the displacement characteristics of the second portion are symmetric about the deflection axis and wherein said cutting step includes the step of cutting a curved path through the conductive sheet, each point along the path being a first precalculated distance from the deflection axis.

6. The method as claimed in claim 4 or claim 5 wherein the step of cutting a curved path includes the step of cutting a curved path which is closed upon itself, said closed curved path defined by the perimeter of the first part of the conductive sheet, the deflection axis extending through the first part of the conductive sheet.

7. The method as claimed in claim 4 or claim 5 wherein the step of cutting a curved path includes the step of cutting a curved path which is closed upon itself, said closed curved path defined by the perimeter of the first part of the conductive sheet, the deflection axis extending through the center of the first part of the conductive sheet.

8. The method as claimed in claim 4 wherein the step of cutting includes the step of cutting a second curved path through the conductive sheet, every point along the path being a particular precalculated distance from the deflection axis.

9. The method as claimed in claim 5 wherein the step of cutting includes the step of cutting a second curved path through the conductive sheet, each point along the path being a second precalculated distance from the deflection axis, said second precalculated distance being greater than said first precalculated distance.

10. The method as claimed in claim 4 or claim 8 wherein the step of cutting includes the step of cutting a pair of non-coincident paths through the conductive sheet, each of said non-coincident paths intersecting the curved path.

11. The method as claimed in claim 5 or claim 9 wherein the step of cutting includes the step of cutting a pair of non-coincident paths through the conductive sheet, every point along the non-coincident paths being spaced at least said first precalculated distance from the deflection axis, said non-coincident paths extending in a radial direction away from the deflection axis and intersecting said curved path.

* * * * *